United States Patent Office 3,776,872
Patented Dec. 4, 1973

3,776,872
PROCESS FOR THE PRODUCTION OF AQUEOUS DISPERSIONS OF MODIFIED SYNTHETIC CONJUGATED DIENE POLYMERS
Gerardus E. La Heij and Gerrit J. van Amerongen, Amsterdam, Netherlands, assignors to Shell Oil Company, New York, N.Y.
No Drawing. Continuation-in-part of abandoned application Ser. No. 882,743, Dec. 5, 1969. This application Mar. 16, 1972, Ser. No. 235,327
The portion of the term of the patent subsequent to Feb. 15, 1989, has been disclaimed
Int. Cl. C08d 5/02, 5/04
U.S. Cl. 260—29.7 AT     8 Claims

ABSTRACT OF THE DISCLOSURE

A process for the production of dispersions of synthetic conjugated diene solution polymers containing toluene insoluble gel comprises treatment of an aqueous polymer dispersion with a free radical yielding substance at a temperature above 20° C., in the absence of a compound that would form a redox system.

---

This application is a continuation-in-part of Ser. No. 882,743, filed Dec. 5, 1969, now abandoned.

The invention relates to a process for the production of aqueous dispersions of modified synthetic conjugated diene polymers obtained in solution. The term "diene polymers" includes homopolymers of conjugated dienes and also copolymers of different conjugated dienes or of conjugated dienes with other ethylenically unsaturated monomers such as styrene.

The invention also relates to aqueous dispersions which contain one or more polymers modified by the above-mentioned process, or mixtures of these with one or more other polymers. The term "other polymers" includes the unmodified polymers from which the modified polymers are prepared. The final dispersion products may or may not contain antioxidants, fillers (in particular reinforcing fillers such as carbon black or silicas with small particle size), vulcanization agents, extending oils and the like. Processes for the manufacture of vulcanized products employing the dispersions prepared according to the invention, e.g., by immersion coagulation or as latex foams, also fall within the scope of the invention.

The invention relates in particular to the preparation and application of dispersions of modified conjugated diene rubber solution polymers, in which at least 40% and preferably at least 80% of the diene units are bound by cis 1,4-addition (determined by means of nuclear spin resonance), and most preferably to isoprene polymers.

Particularly suitable diene polymers to be modified are homopolymers and copolymers of alkadienes having 4 to 6 carbon atoms such as butadiene, isoprene, piperylene or ethylbutadiene, which have been prepared in solution with the aid of a lithium-hydrocarbyl compound or a "Ziegler" catalyst, for example catalysts produced by the interaction of (1) an organo-metallic compound for compound containing at least one metal-carbon bond with (2) a compound of a "heavy metal" of the 4th to the 10th positions of the Periodic Chart in which the elements are arranged in short and long periods and in which the alkali metals occupy the first position (see the Periodic Chart of the Elements, on pages 342-343 of the 33rd Edition of the Handbook of Chemistry and Physics, published 1951 by the Chemical Rubber Publishing Co., Cleveland, Ohio). Such metals are those of Periodic Groups IV-B, V-B, VI-B, VII-B, and VIII including titanium, zirconium, vanadium, niobium, tantalum, chromium, molybdenum, tungsten, manganese, iron, cobalt, rhodium, iridium, nickel, palladium, and platinum, as well as metals in corresponding positions in the last long period in the so-called "actinium series" such as thorium and uranium. While any compound of these metals, whether soluble or insoluble, can be employed, it is preferred to employ those that are anhydrous salts of the formula $M(A)_n$, wherein M is the heavy metal atom, A is a monovalent anion (preferably non-oxidizing in character) and $n$ is one of the higher valence states of the metal, preferably the highest. Especially preferred are the anhydrous halides (chlorides, bromides, iodides and fluorides) of these metals. The tetrachloride of titanium is preferred for the preparation of all-cis 1,4 polyisoprenes; and the dichloride of cobalt for all-cis 1,4-polybutadiene. Other useful heavy metal salts include the inorganic salts such as the oxyhalides and sulfates and other organic salts such as acetates, acetylacetonates and oxalates of the heavy metals of the above-defined groups.

The heavy metal compounds are converted into active catalysts by interaction with a correct proportion of an organo-metallic compound containing at least one carbon-to-metal linkage, that is, a metal atom attached to an organic group through a carbon-to-metal linkage. Such organo-metallic compounds include alkali-metal hydrocarbyls; alkaline-earth hydrocarbyls; similar compounds of magnesium and zinc; aluminium hydrocarbyls; and complexes of one or more of these and/or with still other metals. The term "hydrocarbyl" is employed herein to mean any compound wherein a hydrocarbon radical (hence the term "hydrocarbyl"), including aliphatic, cycloaliphatic and aromatic hydrocarbon radicals, is attached to a metal through a carbon atoms. Thus, there may be utilized sodium, potassium, and lithium alkyls, magnesium alkyls, zinc alkyls, lead alkyls, tin alkyls, aluminum alkyls, aluminum aryl, aluminum aralkyls, aluminum alkaryls, complexes such as sodium aluminum tetrabutyl and many others.

Greatly preferred are the organo-aluminum compounds (aluminum hydrocarbyls) of the structure

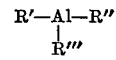

wherein R' is a hydrocarbon radical, R" is another R' group, an —OR— group, a hydrogen atom or a halogen atom, and R'" is another R' or hydrogen. Particularly preferred are the aluminum tri-(alkyl) hydrocarbyls such as triethyl aluminum, tripropyl aluminum, tri-n-butyl aluminum, triisobutyl aluminum, triocryl aluminum, and the like.

Suitable diene polymers include solution polymerized polyisoprene and polybutadienes as well as copolymers of butadiene with a monovinyl arene such as styrene, or alpha methylstyrene, and copolymers being prepared in solution preferably with the aid of a lithium hydrocarbyl compound.

The process according to the invention aims at using the above-mentioned polmers as starting materials for the preparation of dispersions of modified polymers, the compositions of which have an improved modulus in the vulcanized state, whether or not they contain reinforcing fillers and other additives as desired. In particular the aim of the invention is to prepare vulcanized foams with an improved modulus and to manufacture vulcanized articles obtained by the coagulant dipping procedure, also with an improved modulus.

In our U.S. Pat. 3,642,762 a process is described in which inter alia, the same aims are pursued. In the process of said patent an aqueous dispersion of a conjugated diene polymer in solution is reacted with a redox system containing a hydroperoxide initiator at a temperature between 10° and +50° C., and most preferably between 15 and 30° C.

It has now been found that these aims may be achieved by reacting an aqueous dispersion of the polymer obtained in solution with a compound which releases free radicals under these conditions, in the absence of a compound which releases free radicals must, however, take place the given conditions. The contact with the compound which releases free radicals must, however, take place at a temperature above 20° C., preferably between 50° C. and 80° C., e.g., from about 55° C. to about 75° C., and most preferably at a temperature from about 60° C. to about 70° C.

The duration of the reaction may vary from about 3 minutes to 16 hours, depending on the chosen temperature and the particular compound which releases free radicals. Usually the duration of the reaction is between about 30 minutes and six hours. The reaction may be brought to a stop by the addition of a free radical terminator, such as, e.g., hydroquinone, sodium dimethylthiocarbamate and the like.

The aqueous dispersion of the diene polymer to be treated is obtained by emulsifying in water a non-aqueous solution of this polymer, preferably a hydrocarbon solution in which the polymer to be modified has been prepared. However, best results are obtained when solutions of polymer are free of unsaturated solvents. Preferably the dispersions to be treated are those which have been obtained from the above-mentioned emulsions by removing the solvent for the polymer from the dispersion after emulsification, so as to concentrate the solids content.

Most suitably the solid matter content of the polymer dispersion to be modified is at least 60% w.

Compounds which release free radicals well known in the art, including azo compounds, and acyl peroxides, as well as peresters and percarbonates. Exemplary are azo-bisisobutyronitrile, diazoaminobenzene, dinonanoyl peroxide, diisopropyl peroxydicarbonate, dicyclohexyl peroxydicarbonate, 2,4-dichlorobenzoyl peroxide, cyclohexanone peroxide, tert-butylperoxy isobutyrate, tert-butyl peroctoate, caprylyl peroxide, tert-butylperpivalate, succinic acid peroxide, hydroxyheptyl peroxide, p,p'-dimethoxybenzoyl peroxide and the like. Numerous other free radical compounds appear in Brandrup and Immergut ed. Polymer Handbook (1966), pages II-3 to II-51. Preference is given to organic peroxides such as the acyl peroxides, for example, dibenzoyl peroxide or dilauroyl peroxide, and the percarbonates, for example, di-sec-butyl peroxydicarbonate or n-propyl percarbonate.

Preferred compounds which release free radicals have a half-life less than about 10 hours at 80° C. in an aqueous environment.

The concentrations of the compound which releases free radicals may vary in the range between about .01 and 1.0 phr. depending primarily on the product properties desired and also, inter alia, on the type of the said compound. Generally lesser amounts are required when the most active free radical compounds are employed.

In general, the compounds which release free radicals may be added at any moment during or after the preparation of the dispersion. In certain cases it may, however, be advisable to comply with certain conditions regarding the temperature, in order to prevent a premature reaction. In such cases heating to the reaction temperature is generally postponed.

It is, for example, recommended that, in order to obtain a good contact between the compound which releases free radicals and the polymer to be modified, even if it is desired to make the reaction take place after concentration, the former compound should be added already to the solution of the polymer to be modified before it is emulsified. Care should then preferably be taken to prevent the reaction from taking place before emulsification has completely, or almost completely finished, as otherwise the emulsification will be impeded by premature gelation. The temperature at which the compound which releases the free radicals is added to the polymer solution to be emulsified and the temperature during emulsification are in these cases both chosen so that they are lower than the reaction temperature and preferably so low that the reaction cannot, or can scarcely, occur and preferably the temperature should not exceed 20° C.

In cases where the dispersion of the diene polymer to be modified is obtained by removing the solvent for the polymer from the dispersion after emulsification and the compound which releases free radicals has already been added to the polymer solution to be emulsified, the removal of this solvent should also take place at a temperature beneath the chosen reaction temperature, and likewise preferably at a temperature of less than 50° C. or, again most preferably, at a maximum temperature of 20° C. If necessary, reduced pressure is applied here.

The compound which releases free radicals may, of course, also be added just at the moment at which it is desired to make the reaction take place, for example, after the dispersion has been freed of solvent and then concentrated. The dispersion is then brought to the required reaction temperature either shortly before or shortly after this compound is added.

Suitable solvents for the diene polymers to be modified may be those which contain one or more aliphatic monoolefinic hydrocarbons and have a boiling point below 50° C. This condition is satisfied, for example, if a hydrocarbon mixture, comprising chiefly pentene isomers, is used if the monomer is isoprene and if a solution of the polyisoprene to be modified is prepared in this hydrocarbon mixture as the solvent and in the presence of a lithium-hydrocarbyl compound. Particularly when this or another unsaturated solvent is used, it is advisable for the modification reaction involved to take place after the solvent has been removed from dispersion obtained by emulsification.

The improvement in the properties of the modified polymers which have been prepared in accordance with the present process as compared with those of the unmodified polymers in solution must be attributed to the presence of a gel which is formed during the reaction. This gel appears to have a favorable structure with a low degree of cross-linking and is called "loose" gel, in contrast to the "tight" gel which has a high degree of cross-linking. The "gel content" of the polymers which the present process aims to prepare is defined as the proportion of the polymer which is insoluble in toluene at 20° C. As a rule very high gel contents, for example, higher than 60% w., are less desirable, because the tensile strength of the vulcanized products is adversely affected.

It is therefore preferable to ensure that the gel content of the polymer material in the final dispersion is in the range from 5 to 60% w.

If it is desired to prepare mixtures of polymers, modified according to the invention, with other polymers, the polymer dispersion (A), obtained by reaction with compounds which release free radicals, may very conveniently be mixed with a solution or an aqueous dispersion (B) of the other polymer, in particular if this is a conjugated diene polymer which differs from the modified polymer obtained by the above-mentioned reaction. Preference is given to mixtures in which the other conjugated diene polymer present in solution or dispersion (B) and the polymer to be modified by the reaction according to the invention are the same.

The last case is of special importance if the gel content of the polymer which has been reacted with compounds which release free radicals has become too high. Polymer material with the desired gel content may then be prepared by mixing the polymer dispersion (A) which has undergone the above-mentioned reaction with the solution or aqueous dispersion (B) of the original unmodified polymer. It is also possible to prepare mixtures of aqueous dispersions of polymers of differing origins which have undergone the reaction according to the invention or of polymers of the same origin which have undergone the reaction but have differing gel contents. The most attractive mixing method is that by which the aqueous dispersion (A) is mixed, after the reaction in question, with a solution (B) of the other conjugated diene polymer, after which the solvent which has been introduced with the above-mentioned polymer solution is removed. If desired, an extra quantity of emulsifier is added before, during or after mixing in order to ensure the stability of the latex during mixing or removal of the solvent.

The parts hereinafter referred to in the examples refer to parts by weight.

EXAMPLE I 0.10 part of benzoyl peroxide was dissolved at 20° C. in 500 parts of a 20% w. isoprene rubber solution, obtained by the polymerization of isoprene in the presence of a lithium hydrocarbyl compound as initiator and of a hydrocarbon mixture, containing chiefly pentene isomers, as a solvent, the polymer of which was gel-free and had an intrinsic viscosity of 8.2 (measured in toluene at 30° C.). This solution was then emulsified in a mixer of the Ultra-Turrax type with 600 parts of an aqueous soap solution containing 3 parts of potassium oleate, after which the mixture of hydrocarbons was removed by distillation under reduced pressure at 20° C. The aqueous polymer dispersion obtained in this way which contained approximately 13% w. of polymer was concentrated by means of centrifuging in a Sharples super-centrifuge until the solid matter content was approximately 65% w. After this latex had been freed of dissolved acid by stripping with nitrogen, it was heated for one hour at 80° C., mixed with a solution of 0.15 part of sodium dimethyldithiocarbate (as terminator) in 10 parts of water and cooled to room temperature.

In order to ascertain the gel content of the modified polymer in the latex end product obtained in this way, part of this dispersion was coagulated by the addition of ethanol in a 96% w. concentration, after which the coagulum was separated off and dried for ten hours at 60° C. under reduced pressure. It was found that 45% w. of the product obtained in his way was insoluble in toluene at 20° C.

EXAMPLE II

The experiment described in Example I was repeated, but with the difference that 0.25 part of dibenzoyl peroxide was used instead of 0.10 part. The gel content of the modified rubber after coagulation and drying was then found to be approximately 80% w.

EXAMPLE III

The experiment described in Example I was repeated, with the difference that 0.05 part of dilauroyl peroxide was used instead of 0.10 part of dibenzoyl peroxide. The modified polymer now contained 15% w. of gel.

EXAMPLE IV

The experiment described in Example I was repeated, but with the difference that the compound releasing free radicals was azo-bis-isobutyronitrile, 0.20 part of which was dissolved in the polymer solution to be emulsified. In this experiment 0.20 part of hydroquinone, dissolved in 10 parts of water, was used as the terminator. A value of 60% w. was now found for the gel content of the modified rubber.

EXAMPLE V

Test sheets were made from five different latices, A, B, C, D and E by the coagulant dipping procedure as described below. Latex A (blank) was the concentrated latex of the still unmodified polyisoprene, described in Example I, which contained no gel. Latices B, C, D and E were modified polyisoprene latices obtained from latex A according to the present invention. Latex B was prepared as described in Example III, latex C was the latex end product obtained according to Example IV and latex E the modified latex prepared according to Example II.

The coagulant dipping procedure for the preparation of the test sheets was carried out as follows. To each latex was added aqueous dispersions or aqueous solutions of vulcanization ingredients as shown in Table A below, in the concentrations and quantities given.

TABLE A

| Latex | Percent w. of solid matter | Dry solid matter in parts per 100 parts of rubber (phr.) |
|---|---|---|
| | 65 | 100 |
| Ammonium caseinate | 10 | 0.5 |
| Sulphur | 50 | 1.5 |
| Zinc dimethyl carbamate | 50 | 1.0 |
| A C⁷ amine prepared by condensation of heptanal and aniline | 50 | 0.5 |
| Dibutylammonium oleate | 10 | 0.5 |
| 2 2′-methylene-bis(4-ethyl-6 tert-butylphenol) | 33 | 2.0 |

After the latices obtained in this way had been diluted with distilled water to give a solids content of 51% w., sheets of glass on which the test plates had to be formed were dipped, first in a 30% w. solution of calcium nitrate in ethanol and then in the latex to be evaluated, after this had been mixed with the above-mentioned ingredients. The polymer contained in the latex adhering to the sheets of glass was allowed to settle for 30 minutes, after which

TABLE B

| | Vulcanized test sheet made from— | | | | |
|---|---|---|---|---|---|
| | Latex A (blank) | Latex B (from Example III) | Latex C (from Example I) | Latex D (from Example IV) | Latex E (from Example II) |
| Gel content of the polymer, percent w | 0 | 15 | 45 | 60 | 80 |
| 300% modulus, kg./cm.² | 12 | 14 | 16 | 16 | 18 |
| 500% modulus, kg./cm.² | 25 | 27 | 28 | 30 | 32 |
| 700% modulus, kg./cm.² | 48 | 65 | 85 | 95 | 120 |
| Tensile strength, kg./cm.² | 340 | 350 | 365 | 365 | 310 |
| Elongation at break, percent | 1,010 | 1,000 | 980 | 1,010 | 920 | the films obtained were washed for 30 minutes with water which had a temperature of 50° C., dried for three hours at 60° C. and cured for 45 minutes at 110° C.

The stress-strain properties of the vulcanized test sheets obtained in this way were determined in accordance with ASTM D412–61T, die D. The results are given in Table B.

EXAMPLE VI

Vulcanized polymer foams were prepared from the five latices, A, B, C, D and E described in Example V according to the Dunlop process as described in British patent specification 332,525. For this purpose the ingredients given below in parts per 100 parts of dry polymer were stirred into the latices at about 20° C.

| | |
|---|---|
| Potassium oleate | 0.75 |
| Zinc dimethyldithiocarbamate | 1.5 |
| Zinc mercaptobenzothiazole | 1.5 |
| Sulphur | 2.5 |
| Agerite Spar, a registered trademark for a phenolic antioxidant | 2.0 |
| Tylose C 30, a registered trademark for sodium carboxymethylcellulose | 0.2 |

The potassium oleate was added in the form of a 50% w. aqueous solution, the Tylose as a 10% w. aqueous solution and the other compounds as 50% w. aqueous dispersions.

The mixtures obtained in this way were allowed to stand for 18 hours at approximately 20° C., after which 0.8 part of a condensation product of formaldehyde, ammonia and ethyl chloride was added per 100 parts of dry polymer.

The mixtures were then beat into a foam in a Hobart mixer; the beating times are given in Table C. During beating the following ingredients were added:

| | |
|---|---|
| Zinc oxide | 3.0 |
| A mixture of: $Na_2SiF_6$ and Nonidet $P_{40}$ (a registered trademark for a product of the reaction between octylphenol and ethylene oxide in a molar ratio of about 1:8) | 0.2 |

Both the zinc oxide and the above-mentioned mixture were added in the form of a 50% w. aqueous dispersion.

After stirring had been concluded the latex foams were poured into mold and gelated at about 20° C.; the gelation times are given in Table C. The molds were then heated for 30 minutes in an oven to 100° C. by means of direct contact with steam, after which the molds were taken out of the oven and the hot foams removed. Finally, the foams were washed in cold water and dried at about 80° C. Properties of the foams are given in Table C.

TABLE C

| | Foam products from latex | | | | |
|---|---|---|---|---|---|
| | A | B | C | D | E |
| Gel content of polymer, percent w. | 0 | 15 | 45 | 60 | 80 |
| Beating time, minutes | 8 | 4 | 3 | 4 | 4 |
| Gelation time, minutes | 6 | 6 | 7 | 6 | 7 |
| Density, g./l. | 80 | 80 | 80 | 80 | 80 |
| Modulus at— | | | | | |
| 25% compression, g./cm.³ * | 12 | 13 | 16 | 17 | 18 |
| 40% compression, g./cm.³ * | 20 | 23 | 30 | 34 | 38 |
| Elongation at break, percent* | 380 | 260 | 260 | 240 | 230 |
| Permanent deformation at 50% compression for 22 hours at 70° C., percent of thickness during compression* | 12 | 11 | 11.5 | 12 | 11 |
| Linear shrinkage due to vulcanization, percent | 3.0 | 3.4 | 3.6 | 4.0 | 3.9 |

*Determined according to NENN No. 3118 December 1964.

This table shows clearly that the pressure moduli of the foam products are improved considerably in comparison with those of the reference product made from Latex A, while retaining very acceptable elongation at break, permanent deformation under compression, and linear shrinkage after vulcanization.

We claim as our invention:

1. A process for the production of an aqueous dispersion of a gel-containing product of a synthetic conjugated diene polymer which has been obtained in the form of solution from the group comprising polymers of conjugated diene hydrocarbons having 4 to 6 carbon atoms and prepared with the aid of a lithium hydrocarbyl compound or a Ziegler catalyst which process comprises reacting an aqueous dispersion of the diene polymer to be modified at a temperature in the range from 50° to 80° C. with a compound which releases free radicals under these conditions selected from azo compounds, percarbonates and organic peroxides, at a concentration in the range between about 0.1 and 1.0 phr. and in the absence of a compound which would form a redox system under the given conditions during this reaction, whereby a toluene insoluble gel content of said diene polymer in the final dispersion between 5 and 60% by weight is obtained.

2. A process as in claim 1 wherein the compound which releases free radicals is added to a solution of the diene polymer to be modified in a hydrocarbon free of unsaturated solvents before it is emulsified with water to obtain said aqueous dispersion of diene polymer to be modified and that the temperature at which this addition takes place does not exceed 20° C.

3. A process as in claim 1 wherein the diene polymer to be modified is an isoprene polymer.

4. A process as in claim 3 wherein the diene polymer is homopolyisoprene prepared with the aid of a lithium hydrocarbyl initiator.

5. A process as in claim 1 wherein the reaction temperature is from about 55 to about 75° C.

6. A process as in claim 1 wherein the compound which releases free radicals is selected from azo compounds and acyl peroxides.

7. A process as in claim 1 wherein the compound which releases free radicals is a percarbonate.

8. A process as in claim 1 wherein the compound which releases free radicals is selected from azo-bisisobutyronitrile, diazoaminobenzene, dibenzoyl peroxide and dilauroyl peroxide.

References Cited

UNITED STATES PATENTS

| | | | |
|---|---|---|---|
| 3,642,762 | 2/1972 | Heij et al. | 260—94.7 A |
| 2,975,151 | 3/1961 | Ropp | 260—29.7 A |

FOREIGN PATENTS

| | | |
|---|---|---|
| 813,198 | 5/1959 | Great Britain. |

THEODORE MORRIS, Primary Examiner

U.S. Cl. X.R.

260—29.7 NQ, 94.7 A